United States Patent [19]
Molburg

[11] Patent Number: 6,079,309
[45] Date of Patent: Jun. 27, 2000

[54] CUTTING GUIDE WITH INTEGRAL SUPPORTIVE CLAMPING AND ALIGNMENT

[76] Inventor: John C. Molburg, 205 S. Menominee Dr., Minooka, Ill. 60447

[21] Appl. No.: 08/977,841

[22] Filed: Nov. 24, 1997

[51] Int. Cl.[7] .................................................. B26D 7/04
[52] U.S. Cl. .................................. 83/745; 83/574; 83/614
[58] Field of Search .............................. 83/745, 574, 614, 83/454, 455, 464

[56] References Cited

U.S. PATENT DOCUMENTS

| | | | |
|---|---|---|---|
| 2,677,399 | 5/1954 | Getsinger | 143/6 |
| 2,708,465 | 5/1955 | Huebner et al. | 143/47 |
| 2,735,456 | 2/1956 | Grier et al. | 143/6 |
| 2,773,523 | 12/1956 | Hopla | 143/6 |
| 2,942,633 | 6/1960 | King | 143/6 |
| 3,085,343 | 4/1963 | Skripsky | 33/8 |
| 3,287,808 | 11/1966 | Fortune | 83/614 X |
| 3,389,724 | 6/1968 | Paul | 143/160 |
| 3,536,112 | 10/1970 | Kordyban | 143/6 |
| 3,586,077 | 6/1971 | Pease | 143/6 G |
| 3,829,231 | 8/1974 | Hamilton | 408/108 |
| 3,830,130 | 8/1974 | Moore | 83/745 |
| 3,869,951 | 3/1975 | Litwin | 83/475 |
| 3,874,261 | 4/1975 | Murray | 83/471.3 |
| 3,910,146 | 10/1975 | Earl | 83/745 |
| 3,979,987 | 9/1976 | Mayhew et al. | 83/745 |
| 3,983,776 | 10/1976 | Flanders | 83/745 |
| 4,023,273 | 5/1977 | Treleaven | 30/373 |
| 4,028,976 | 6/1977 | Kundikoff | 83/745 |
| 4,031,974 | 6/1977 | Leihgeber | 83/829 |
| 4,050,340 | 9/1977 | Flanders . | |
| 4,054,077 | 10/1977 | Gram | 83/745 |
| 4,056,028 | 11/1977 | Patterson | 83/745 |
| 4,059,038 | 11/1977 | Reitema | 83/745 |
| 4,065,114 | 12/1977 | Pennington | 269/2 |
| 4,075,920 | 2/1978 | Neal | 83/745 |
| 4,077,292 | 3/1978 | Cole | 83/745 |
| 4,096,777 | 6/1978 | Adams | 83/455 X |
| 4,125,942 | 11/1978 | Horner et al. | 33/76 R |
| 4,179,965 | 12/1979 | Johnson | 83/745 |
| 4,202,233 | 5/1980 | Larson | 83/745 |
| 4,224,855 | 9/1980 | Des Roches | 83/745 |
| 4,244,118 | 1/1981 | Matuszak | 33/430 |
| 4,281,572 | 8/1981 | Stovall | 83/745 |
| 4,291,602 | 9/1981 | Fast et al. | 83/574 |
| 4,306,479 | 12/1981 | Eberhardt | 83/745 |
| 4,307,513 | 12/1981 | Genge | 30/372 |
| 4,335,512 | 6/1982 | Sheps et al. | 30/376 |
| 4,356,748 | 11/1982 | Tilton | 83/745 |
| 4,381,103 | 4/1983 | Ferdinand et al. | 269/1 |

(List continued on next page.)

*Primary Examiner*—Rinaldi I. Rada
*Assistant Examiner*—Ana Luna
*Attorney, Agent, or Firm*—Cherskov & Flaynik

[57] ABSTRACT

A portable guide for use with portable power tools such as saws and routers to assist in making straight cuts or grooves precisely located in panels or sheets by moving the tool along a straight edged guide bar (10). Clamp assemblies (20R) (20L) secure said guide bar to the workpiece and support the workpiece by clamping on both sides of the line of cut. Means are provided to avoid interference between said clamp assemblies and the cutter. A template (40) precisely locates the clamp assemblies relative to the line of cut. A lateral guide (30) may be attached to the tool without tool modification. Said lateral guide interacts slidably with the guide bar (10) and prevents movement of the tool away from the intended line of cut.

3 Claims, 7 Drawing Sheets

U.S. PATENT DOCUMENTS

| | | | |
|---|---|---|---|
| 4,453,438 | 6/1984 | Zelli | 83/745 |
| 4,463,644 | 8/1984 | Ferdinand et al. | 83/745 |
| 4,494,434 | 1/1985 | Young | 83/745 |
| 4,522,098 | 6/1985 | Bliss | 83/745 |
| 4,539,881 | 9/1985 | Maier | 83/745 |
| 4,619,170 | 10/1986 | Maier et al. | 83/745 |
| 4,630,656 | 12/1986 | Collins | 83/574 X |
| 4,677,750 | 7/1987 | Maier et al. | 30/376 |
| 4,736,523 | 4/1988 | Hanning | 33/42 |
| 4,777,726 | 10/1988 | Flowers | 30/374 |
| 4,811,643 | 3/1989 | Krieger | 83/745 |
| 4,843,728 | 7/1989 | Francis | 33/640 |
| 4,867,425 | 9/1989 | Miraglia, Jr. | 269/1 |
| 4,919,384 | 4/1990 | Grimberg | 248/646 |
| 4,947,910 | 8/1990 | Reneau | 83/745 X |
| 4,995,288 | 2/1991 | DellaPolla | 83/574 |
| 5,084,977 | 2/1992 | Perkins | 30/374 |
| 5,138,759 | 8/1992 | Gruetzmacher | 29/467 |
| 5,148,730 | 9/1992 | McCaw | 83/745 |
| 5,182,975 | 2/1993 | Warner | 83/745 |
| 5,206,999 | 5/1993 | Stone | 30/372 |
| 5,226,345 | 7/1993 | Gamble | 83/745 |
| 5,271,159 | 12/1993 | Chen et al. | 33/403 |
| 5,365,822 | 11/1994 | Stapleton | 83/745 |
| 5,394,781 | 3/1995 | Tsubai | 83/449 |
| 5,427,006 | 6/1995 | Finley | 83/574 |
| 5,472,029 | 12/1995 | Ketch | 144/371 |

CUTTING GUIDE WITH INTEGRAL SUPPORTIVE CLAMPING AND ALIGNMENT

BACKGROUND—FIELD OF INVENTION

This invention relates to portable cutting guides, specifically guides used to accurately locate cuts or grooves made in flat panels with portable cutting or routing tools.

BACKGROUND—DISCUSSION OF PRIOR ART

Guide devices for portable tools, such as routers or circular saws, are the subject of extensive prior art. Guides are essential to successful cutting or grooving of sheet materials, such as plywood. Many devices have been developed to guide portable tools in these operations. The most successful of these are stationary devices, commonly known as panel saws. These provide a rigid supporting frame for the panel being cut or grooved and a sliding support to which the tool is attached that can be aligned with the desired line of cut. Panel saws are not relevant prior art for the subject invention, which is portable and can be produced at low cost.

The extensive prior art in portable devices has significant shortcomings. These shortcomings include:

A. lack of convenient and economical means of preventing the saw base plate from moving away from or underneath the guide, B. lack of an adequate and convenient means of clamping the guide to the workpiece, C. lack of convenient, durable, and universal means of setting the guide bar position relative to the line of cut for cuts perpendicular or diagonal to the edge of the workpiece.

In addition, the most common commercial manifestations of the prior art are not suitable for sustained professional use because of low strength and durability. In this discussion we have referred primarily to applications for cutting or sawing operations. It is understood that some of the prior art is also applicable to guiding router operation, and that these comments apply as well to such use.

SUMMARY OF PRIOR ART

Each example of prior art can be described according to how it addresses three fundamental requirements. These requirements correspond to the shortcomings noted as A, B, and C in the previous paragraph.

Requirement A: The guide must provide lateral support to prevent the saw from moving away from the intended line of cut.

Requirement B: The guide must be secured relative to the workpiece during the cutting operation.

Requirement C: The guide must be aligned so that the saw cut is in the intended location even though the edge of the tool base plate is invariably offset from the blade or cutter.

To clarify the discussion of the prior art we have categorized representative devices according to the approach taken toward meeting each of these requirements. The approach taken to requirement A defines the lateral support system. The approach taken to requirement B defines the clamping system. The approach taken to requirement C defines the alignment system.

Lateral Support System

Each example of prior art uses one of four types of lateral support: 1) guide bar or straight edge only, 2) tool base attachment or modification, 3) saw supported on guide bar or bar extension, and 4) frame-type.

The straight edge only type of device simply provides a rigid guiding edge along which the base plate of the saw is manually held during cutting. This type of device is the most economical but fails to provide adequate lateral guidance. That is, the saw can drift away from the guiding edge or, if the material being cut is flexible, the base plate of the saw can slip under the guiding edge. U.S. Pat. No. 4,381,103 to Ferdinand, et al, (1983) describes a device of this type. U.S. Pat. No. 5,138,759 to Gruetzmacher (1992) also describes a device of this type. In both cases, the focus of the patent is on a novel means of connecting two shorter guides to create one long guide. A widely distributed commercial version of each of these devices is now available. While differing in design details, the patents listed in Table 1 all describe devices that are of the straight edge only type. The patent descriptions for these devices do not specify any means to prevent lateral movement of the saw other than contact on one side of the saw base plate.

TABLE 1

Patents Covering Straight-Edge Only Devices

| Patent | Inventor | Date Granted |
| --- | --- | --- |
| 3,085,343 | Harold O. Skripsky | April 16, 1963 |
| 3,874,261 | Gerald A. Murray | April 1, 1975 |
| 3,910,146 | William L. Earl | October 7, 1975 |
| 4,031,974 | Joseph Q. Leihgeber | June 28, 1977 |
| 4,054,077 | Reginald H. Gram | October 18, 1977 |
| 4,065,114 | Charles A. Pennington | December 27, 1977 |
| 4,179,965 | F. Walter Johnson | December 25, 1979 |
| 4,736,523 | James Hanning | April 12, 1988 |
| 4,843,728 | John G. R. Francis | July 4, 1989 |
| 4,056,028 | G. Keith Patterson | November 1, 1977 |
| 4,306,479 | James F. Eberhardt | December 22, 1981 |
| 4,381,103 | Irwin J. Ferdinand, et al | April 26, 1983 |
| 4,463,644 | Irwin J. Ferdinand, et al | August 7, 1984 |
| 5,138,759 | Richard J. Gruetzmacher | August 18, 1992 |
| 5,148,730 | Ronald A. McCaw | September 22, 1992 |
| 5,226,345 | Timothy Gamble | July 13, 1993 |
| 5,472,029 | Andrew D. Ketch | December 5, 1995 |
| 4,281,572 | Marvin S. Stovall | August 4, 1981 |
| 3,287,809 | W. J. Fortune | November 29, 1966 |

The second lateral support system incorporates an attachment or modification to the saw base plate. These attachments include bolt-on or clamp-on extensions to the saw base as well as novel saw base designs, requiring changes in the manufacture of the saw. These base plate modifications are intended to improve guidance of the saw by interacting with the saw guide bar to prevent lateral movement. The attachments or base plate modifications include hooks, glides, bearings, or other devices that slidably interface with the guide bar. The disadvantages of these devices are 1) they add complexity and cost to the cutting guide system, 2) they complicate use of the cutting guide by requiring attachment and alignment of a device not anticipated by the saw manufacturer, 3) they introduce a potential safety hazard if improperly secured or aligned, 4) they reduce the portability and flexibility of the saw to which they are attached, and 5) the attachments may not be appropriate for all saws given the variety of designs and materials used now for saw base plates. As noted, some of the prior art recommends modifications that would have to be incorporated during saw manufacture, making retrofit very inconvenient. Patents listed in Table 2 describe devices that utilize base plate modifications or attachments.

TABLE 2

Patents Covering Devices Requiring Base Plate Attachments or Modifications

| Patent | Inventor | Date Granted |
| --- | --- | --- |
| 2,677,399 | Floyd R. Getsinger | May 4, 1954 |
| 2,708,465 | Floyd C. Huebner | May 17, 1955 |
| 2,942,633 | Berton E. King | June 28, 1960 |
| 2,773,523 | Lloyd M. Hopla | December 11, 1956 |
| 3,586,077 | Mason E. Pease | June 22, 1971 |
| 3,389,724 | Bryant M. Paul | June 25, 1968 |
| 3,536,112 | Steve Kordyban | October 27, 1970 |
| 3,829,231 | Thomas Hamilton | August 13, 1974 |
| 3,869,951 | William J. Litwin | March 11, 1975 |
| 3,979,987 | T. H. Mayhew, M. G. Rice | September 14, 1976 |
| 4,077,292 | Eugene E. Cole | March 7, 1978 |
| 4,202,233 | Keith J. Larson | May 13, 1980 |
| 4,777,726 | Randy Flowers | October 18, 1988 |
| 4,919,384 | Gerhard Grimberg | April 24, 1990 |
| 4,059,038 | Simon P. Reitema | November 22, 1977 |
| 4,291,602 | John Fast, Harvey Williams | September 29, 1981 |
| 4,335,512 | Martin I. Sheps, et al | June 22, 1982 |
| 4,619,170 | Peter Maier | October 28, 1986 |
| 4,677,750 | Peter Maier, Gernot Hansel | July 7, 1987 |
| 5,084,977 | Robert E. Perkins | February 4, 1992 |
| 4,947,910 | Raymond P. Reneau | August 14, 1990 |

The third category of lateral support uses a lateral extension of the guide bar to provide a surface that supports the saw along the entire path of the cut. In essence, the saw rests on a surface of the guide bar during the cut rather than on the workpiece. The actual guiding edge is attached to this surface or is an integral part of the surface formed by a raised edge. This approach prevents the saw base plate from sliding under the guiding edge, since that edge is secured along its length to the supporting plate. However, movement away from the guiding edge is still a potential problem. Some devices in this category improve the lateral support by adding base plate attachments or modifications that slidably attach to the guiding edge. Several devices essentially cradle the saw in a channel to prevent lateral movement. The disadvantages of devices that support the saw on the guide bar or on an extension of the guide bar include additional cost and complexity, particularly for devices incorporating attachments to the saw base. Patents that define devices supporting the base of the saw along the line of cut are listed in Table 3.

TABLE 3

Devices Supporting the Saw on the Guide Bar or Extension

| Patent | Inventor | Date Granted |
| --- | --- | --- |
| 2,677,399 | Floyd R. Getsinger | May 4, 1954 |
| 2,708,465 | Floyd C. Huebner | May 17, 1955 |
| 3,389,724 | Bryant M. Paul | June 25, 1968 |
| 3,536,112 | Steve Kordyban | October 27, 1970 |
| 3,830,130 | Harold E. Moore | August 20, 1974 |
| 3,869,951 | William J. Litwin | March 11, 1975 |
| 3,983,776 | Robert D. Flanders | October 5, 1976 |
| 4,050,340 | Robert D. Flanders | September 27, 1977 |
| 4,075,920 | Edwin S. Neal | February 28, 1978 |
| 4,919,384 | Gerhard Grimberg | April 24, 1990 |
| 4,059,038 | Simon P. Reitema | November 22, 1977 |
| 4,224,855 | Emile A. Des Roches | September 30, 1980 |
| 4,244,118 | Chester Matuszak | January 13, 1981 |
| 4,291,602 | John Fast, Harvey Williams | September 29, 1981 |
| 4,307,513 | Charles A. Genge | December 29, 1981 |
| 4,356,748 | Charles W. Tilton | November 2, 1982 |
| 4,453,438 | Joseph M. Zelli | June 12, 1984 |
| 4,539,881 | Peter Maier | September 10, 1985 |

TABLE 3-continued

Devices Supporting the Saw on the Guide Bar or Extension

| Patent | Inventor | Date Granted |
| --- | --- | --- |
| 4,619,170 | Peter Maier | October 28, 1986 |
| 4,811,643 | George A. Krieger | March 14, 1989 |
| 4,867,425 | Humbert G. Miraglia, Jr. | September 19, 1989 |
| 5,182,975 | John L. Warner | February 2, 1993 |
| 5,206,999 | Tom Stone | May 4, 1993 |
| 5,365,822 | Michael F. Stapleton | November 22, 1994 |
| 5,427,006 | Joe Finley | June 27, 1995 |
| 4,522,098 | Delbert N. Bliss | June 11, 1985 |

The fourth lateral support category adds further complexity by providing a rigid frame which mounts to a bench or work table. The frame has a plate member to which the saw can be attached and which can slide along the cut axis. The workpiece is generally supported by the bench under the frame and cut by sliding the saw along a rail fixed to the frame. These devices are similar to panel saws, but are more portable and less expensive. Still, relative to the other portable guide types they are quite expensive. In addition, they are complicated to use, requiring securing the saw to the guide plate and rail. This reduces the flexibility of the portable saw. Frame-type devices also restrict flexibility in that the workpiece must be positioned beneath the supporting frame. This limits the angles of cut possible for a large workpiece. Patents describing devices of this type are listed in Table 4. U.S. Pat. No. 4,096,777 to Adams is intended for use with a hand saw and is not readily adaptable for use with a power saw.

TABLE 4

Patents Describing Frame-Type Devices

| Patent | Inventor | Date Granted |
| --- | --- | --- |
| 2,735,456 | James W. W. Grier Verlee P. Grier | February 21, 1956 |
| 4,023,273 | Thomas R. Treleaven | May 17, 1977 |
| 4,125,942 | Ralph J. Homer | November 21, 1978 |
| 4,995,280 | Michael Della Polla | February 26, 1991 |
| 4,947,910 | Raymond P. Reneau | August 14, 1990 |
| 5,427,006 | Joe Finley | June 27, 1995 |
| 5,394,781 | Ryozo Tsubai | March 7, 1995 |
| 4,630,656 | J. W. Collins | December 23, 1986 |
| 4,096,777 | Charles Lee Adams | June 27, 1978 |
| 4,995,288 | Michael Della Polla | February 26, 1991 |

Clamping Systems

Devices covered by prior art do not provide for adequate clamping of the guide bar to the workpiece so that it is secure throughout the cutting process. Much of the prior art provides no integral clamping method, relying on the user to provide a clamping system or on friction to secure the guide to the workpiece. Where a clamping system is mentioned in the prior art, it provides clamping on only one side of the line of cut. This can result in sagging of the workpiece during the cutting or grooving process, allowing the edges of the cut to bind on the cutter and permitting premature separation of the workpiece near the end of the cut. This results in breakage of the workpiece. In addition, this lack of support can create a safety hazard. As the material separates at the end of the cut it will fall if not adequately supported. This subjects the saw operator to risk of injury and the workpiece to damage. Using the prior art, avoiding these problems requires elaborate and time-consuming creation of special supports under the workpiece or assistance from a helper, who holds the workpiece at the end of the cut. None of the prior art incorporates a clamping system which adequately secures the work by providing clamping on both sides of the line of cut, thereby fixing the relative position of the two sections of the workpiece created by the cutting process.

Prior art uses one of five types of clamping systems. In a few instances, more than one type of clamping system is employed for a given device. To some extent, the clamping system is a reflection of the lateral support category, as these are defined above. The clamping systems evident in the prior art are 1) hand held, 2) user-supplied or independent clamps, 3) integral clamps on one side of the cut, 4) nails or screws, and 5) bottom and top rails that sandwich the workpiece.

Hand held devices are generally intended for smaller guides used for cut-off operations on dimensioned lumber, for example U.S. Pat. No. 3,869,951 by Litwin (1975). However, some larger devices are described as hand held employing high friction materials to assist in fixing the guide against the workpiece, for example U.S. Pat. No. 4,811,643 by Krieger (1989). The disadvantages of a hand held device for all but very short cuts are that it is difficult to keep the guide in position and it leaves the operator with only one free hand. Typical human arm length obviously limits the length of cut. Safety concerns of hand held devices are a further disadvantage, especially since the workpiece against which the device is held is being severed by the saw. Frame-type devices are a special case of hand held devices, in which the device is fixed to a bench and the workpiece is hand held in cutting position. Patents describing hand held devices are listed in Table 5.

TABLE 5

Patents Describing Devices With no Mechanical Clamping System (Hand Held)

| Patent | Inventor | Date Granted |
| --- | --- | --- |
| 2,735,456 | J. W. W. Grier, V. P. Grier | February 21, 1956 |
| 3,536,112 | Steve Kordyban | October 27, 1970 |
| 3,869,951 | William V. Litwin | March 11, 1975 |
| 3,979,987 | T. H. Mayhew, M. G. Rice | September 14, 1976 |
| 4,028,976 | Peter Kundikoff | June 14, 1977 |
| 4,054,077 | Reginald H. Gram | October 18, 1977 |
| 4,125,942 | Ralph J. Homer | November 21, 1978 |
| 4,736,523 | James Hanning | April 12, 1988 |
| 4,777,726 | Randy Flowers | October 18, 1988 |
| 4,843,728 | John G. R. Francis | July 4, 1989 |
| 4,995,288 | Michael Della Polla | February 26, 1991 |
| 5,271,159 | Andy H. T. Chen | December 21, 1993 |
| 4,056,028 | G. Keith Patterson | November 1, 1977 |
| 4,306,479 | James F. Eberhardt | December 22, 1981 |
| 4,335,512 | Martin I. Sheps, et al | June 22, 1982 |
| 4,494,434 | Robert W. Young | January 22, 1985 |
| 4,539,881 | Peter Maier | September 10, 1985 |
| 4,619,170 | Peter Maier | October 28, 1986 |
| 4,677,750 | Peter Maier, Gernot Hansel | July 7, 1987 |
| 4,811,643 | George A. Krieger | March 14, 1989 |
| 4,947,910 | Raymond P. Reneau | August 14, 1990 |
| 5,084,977 | Robert E. Perkins | February 4, 1992 |
| 5,226,345 | Timothy Gamble | July 13, 1993 |
| 5,427,006 | Joe Finley | June 27, 1995 |
| 5,394,781 | Ryozo Tsubai | March 7, 1995 |

Devices that rely on the user to supply clamps or on clamps which are not an integral element of the guide design more effectively secure the guide to the workpiece. However, These can be awkward to use as it generally takes a firm hand to hold the guide bar in place leaving only one hand to set and secure the clamps. An additional challenge arises when protecting the workpiece requires the use of pads over the clamp jaws. These must be held in place while setting the clamps. Typically, one clamp is needed at each end of a cut. On longer cuts it is difficult to get both ends of the guide clamped in proper position in one try. Normally, the clamps and guide bar require readjustment after initial clamping. Patents describing devices that require user supplied or independent clamps are listed in Table 6.

TABLE 6

Patents Describing Devices with Independent or User-Supplied Clamping

| Patent | Inventor | Date Granted |
| --- | --- | --- |
| 2,677,399 | Floyd R. Getsinger | May 4, 1954 |
| 2,773,523 | Lloyd M. Hopla | December 11, 1956 |
| 3,536,112 | Steve Kordyban | October 27, 1970 |
| 3,830,130 | Harold E. Moore | August 20, 1974 |
| 3,983,776 | Robert D. Flanders | October 5, 1976 |
| 4,077,292 | Eugene E. Cole | March 7, 1978 |
| 4,125,942 | Ralph J. Horner | November 21, 1978 |
| 4,059,038 | Sinion P. Reitema | November 22, 1977 |
| 4,307,513 | Charles A. Genge | December 29, 1981 |
| 4,453,438 | Joseph M. Zelli | June 12, 1984 |
| 4,677,750 | Peter Maier, Gernot Hansel | July 7, 1987 |
| 4,867,425 | Humbert G. Miraglia, Jr. | September 19, 1989 |
| 5,138,759 | Richard J. Gruetzmacher | August 18, 1992 |
| 5,148,730 | Ronald A. McCaw | September 22, 1992 |
| 5,206,999 | Tom Stone | May 4, 1993 |
| 5,472,029 | Andrew D. Ketch | December 5, 1995 |

An improvement over independent clamps is provided by devices with integral clamping. In such devices, the clamps are secured to the guide bar so that they can be conveniently engaged after aligning the guide bar. Some of the prior art suggests extremely complicated and expensive integral clamping systems, for example U.S. Pat. Nos. 4,244,118 granted to Matuszak (1981) and 5,427,006 granted to Finley (1995). Two general approaches have been taken. One approach applies clamping pressure vertically through the plane of the workpiece, pinching the workpiece between the guide bar above and a clamp pad below. The other approach clamps in the plane of the workpiece like a bar clamp extending across the workpiece, for example U.S. Pat. No. 4,179,965 granted to Johnson (1979). This type of device is useless on flexible panels, which will simply bend under clamping pressure. In spite of the advantages of integral clamps over independent clamps, those of the prior art suffer from the same principal drawback that only one side of the cut is supported. U.S. Pat. No. 4,995,288 granted to Reneau even includes multiple clamps, but they act on only one side of the line of cut. Patents describing devices with integral clamping systems are listed in Table 7.

TABLE 7

Patents Describing Devices with Integral Clamping

| Patent | Inventor | Date Granted |
| --- | --- | --- |
| 2,708,465 | Floyd C. Huebner | May 17, 1955 |
| 2,942,633 | Berton E. King | June 28, 1960 |
| 2,773,523 | Lloyd M. Hopla | December 11, 1956 |
| 3,085,343 | Harold Q. Skripsky | April 16, 1963 |
| 3,586,077 | Mason E. Pease | June 22, 1971 |
| 3,389,724 | Bryant M. Paul | June 25, 1968 |
| 3,829,231 | Thomas Hamilton | August 13, 1974 |
| 3,874,261 | Gerald A. Murray | April 1, 1975 |
| 3,910,146 | William L. Earl | October 7, 1975 |
| 4,023,273 | Thomas R. Treleaven | May 17, 1977 |
| 4,031,974 | Joseph Q. Leihgeber | June 28, 1977 |
| 4,050,340 | Robert D. Flanders | September 27, 1977 |
| 4,065,114 | Charles A. Pennington | December 27, 1977 |
| 4,075,920 | Edwin S. Neal | February 28, 1978 |
| 4,179,965 | F. Walter Johnson | December 25, 1979 |

TABLE 7-continued

Patents Describing Devices with Integral Clamping

| Patent | Inventor | Date Granted |
| --- | --- | --- |
| 4,202,233 | Keith J. Larson | May 13, 1980 |
| 4,919,384 | Gerhard Grimberg | April 24, 1990 |
| 4,224,855 | Emile A. Des Roches | September 30, 1980 |
| 4,244,118 | Chester Matuszak | January 13, 1981 |
| 4,291,602 | John Fast, Harvey Williams | September 29, 1981 |
| 4,356,748 | Charles W. Tilton | November 2, 1982 |
| 4,381,103 | Irwin J. Ferdinand, et al | April 26, 1983 |
| 4,463,644 | Irwin J. Ferdinand, et al | August 7, 1984 |
| 5,365,822 | Michael F. Stapleton | November 22, 1994 |
| 4,947,910 | Raymond P. Reneau | August 14, 1990 |
| 4,281,572 | Marvin S. Stovall | August 4, 1981 |
| 3,287,808 | W. J. Fortune | November 29, 1966 |
| 4,522,098 | Delbert N. Bliss | June 11, 1985 |

Several proposed guide devices use nails or screws to secure the guide bar to the workpiece. This approach is clearly tedious and may mar the workpiece. It does have the advantage that it can prevent sagging of the center of a flexible workpiece on a long cut. However, if the workpiece can be supported for nailing to the guide bar, it can be supported during the cut. In general, this is not a practical solution for securing a guide to a workpiece. Patents describing devices incorporating nails or screws as a principal or auxiliary clamping system include U.S. Pat. Nos. 3,830,130 by Moore (1971), 4,224,855 by Des Roches (1980), and 4,453,438 by Zelli (1984).

Some devices use a supporting bar or rail beneath the workpiece and parallel to the guide bar. This essentially clamps or sandwiches the workpiece between the guide bar and the lower rail. This type of system provides excellent support for flexible panels so that the saw base plate cannot slip under the guide bar. However, it is an expensive solution that is rather awkward to affix to the workpiece and that complicates supporting the panel to be cut. In addition, like the other prior art approaches, it does not support the workpiece on both sides of a cut Patents describing devices using top and bottom bars to sandwich the workpiece include U.S. Pat. Nos. 3,389,724 by Paul (1968), 4,075,920 by Neal (1978), and 4,291,602 by Fast (1981).

Alignment Systems

A third difficulty in using a guide for cutting and routing is that the cutting blade or tool is offset from the edge of the base plate of the tool. This offset varies according to the specific tool and cutter in use. It is necessary for the guide user to compensate for this offset by setting the guide parallel to the line of cut, but removed from it by the correct distance. This process introduces errors and is time consuming, particularly since a simple change of blade in a given saw alters the necessary compensation. Further complication is evident for long cuts where the guide must be aligned on both the near and far edges of a cut and then secured to the workpiece. Adjustment of the guide on one edge cannot be made without disturbing the position at the other edge, at least not with any of the prior art devices. Alignment systems in the guides of prior art fall into one of six categories. 1) user measures the offset required, 2) a rod or tab extends from the guide bar or edge clamp and is calibrated by a saw cut, 3) the guide bar has a lateral extension over its entire length that is calibrated by an initial saw cut, 4) the edge stop or clamp is marked by a saw cut, 5) an offset gauge is positioned against the guide bar and aligned with the intended line of cut, and 6) the workpiece is moved to position under the saw, which is fixed laterally by a frame.

Devices in the first category simply rely on the user to measure the offset for a particular saw and set the guide that distance from the intended line of cut. This approach has the obvious disadvantages of inconvenience and risk of error in making the several measurements required to set the guide position on both edges of a workpiece. Patents describing devices for which no alignment means is specified are listed in Table 8.

TABLE 8

Patents Describing Devices with no Alignment System Specified

| Patent | Inventor | Date Granted |
| --- | --- | --- |
| 2,677,399 | Floyd R. Getsinger | May 4, 1954 |
| 2,708,465 | Floyd C. Huebner | May 17, 1955 |
| 3,085,343 | Harold O. Skripsky | April 16, 1963 |
| 3,586,077 | Mason E. Pease | June 22, 1971 |
| 3,389,724 | Bryant M. Paul | June 25, 1968 |
| 3,829,231 | Thomas Hamilton | August 13, 1974 |
| 3,869,951 | William J. Litwin | March 11, 1975 |
| 3,874,261 | Gerald A. Murray | April 1, 1975 |
| 3,979,987 | T. H. Mayhew, M. G. Rice | September 14, 1976 |
| 3,983,776 | Robert D. Flanders | October 5, 1976 |
| 4,023,273 | Thomas R. Treleaven | May 17, 1977 |
| 4,031,974 | Joseph Q. Leihgeber | June 28, 1977 |
| 4,050,340 | Robert D. Flanders | September 27, 1977 |
| 4,077,292 | Eugene E. Cole | March 7, 1978 |
| 4,125,942 | Ralph J. Homer | November 21, 1978 |
| 4,179,965 | F. Walter Johnson | December 25, 1979 |
| 4,202,233 | Keith J. Larson | May 13, 1980 |
| 4,736,523 | James Hanning | April 12, 1988 |
| 4,777,726 | Randy Flowers | October 18, 1988 |
| 4,919,384 | Gerhard Grimberg | April 24, 1990 |
| 4,995,288 | Michael Della Polla | February 26, 1991 |
| 4,224,855 | Emile A. Des Roches | September 30, 1980 |
| 4,335,512 | Martin I. Sheps, et al | June 22, 1982 |
| 4,381,103 | Irwin J. Ferdinand, et al | April 26, 1983 |
| 4,463,644 | Irwin J. Ferdinand, et al | August 7, 1984 |
| 4,619,170 | Peter Maier | October 28, 1986 |
| 4,677,750 | Peter Maier, Gernot Hansel | July 7, 1987 |
| 4,947,910 | Raymond P. Reneau | August 14, 1990 |
| 5,084,977 | Robert E. Perkins | February 4, 1992 |
| 5,138,759 | Richard J. Gruetzmacher | August 18, 1992 |
| 5,394,781 | Ryozo Tsubai | March 7, 1995 |
| 5,427,006 | Joe Finley | June 27, 1995 |
| 4,947,910 | Raymond P. Reneau | August 14, 1990 |
| 4,281,572 | Marvin S. Stovall | August 4, 1981 |
| 4,522,098 | Delbert N. Bliss | June 11, 1985 |

A common system to avoid the need for manually setting the guide bar position is to provide for a rod or tab to be inserted into a receiver in the guide bar. This rod or tab is made of wood or other material that can be cut with the saw. Then, when the saw is first passed along the guide bar, the extending rod or tab will be cut at a distance from the guide bar precisely equal to the correct offset. For subsequent cuts using the same saw and blade, the guide bar is positioned by aligning the cut edge of the rod or tab with the intended line of cut. If the rod or tab is secured to the guide bar, then it can be used for cuts diagonal to the edge of the workpiece as well as for perpendicular cuts. A disadvantage of this approach is that the rod or tab must be removed from the guide bar during the cut so that it does not interfere with the saw's path along the guide bar. Some rather complicated schemes have been devised to implement this simple concept. This translates into high cost and inconvenience. Another difficulty is that a rod or tab at the end of a guide bar is useless for setting the bar for shorter cuts where the guide bar extends beyond the workpiece. To overcome this difficulty, movable tabs have been proposed. This further complicates construction of the guide bar. An alternative is to insert the measuring tab or rod into the end clamp of the guide bar. This applies only for cutting guides that have integral clamping systems. With this approach, the rod or tab can be used on any width workpiece. Unfortunately, a given rod or tab is only useful for one particular angle of cut if it is fixed to the end clamps. Finally, all of these devices have the aforementioned shortcoming that setting the guide on one edge of a workpiece will typically change the position of the guide at the other edge, requiring an iterative process to obtain an accurate setting. It would be preferable if alignment at one edge were independent of alignment at the other edge. Patents describing devices that employ a rod or tab calibrated by a saw cut as an alignment aid are listed in Table 9.

TABLE 9

Patents Describing Devices Using a Rod or Tab Extending from the Guide Bar for Alignment

| Patent | Inventor | Date Granted |
|---|---|---|
| 4,028,976 | Peter Kundikoff | June 14, 1977 |
| 4,843,728 | John G. R. Francis | July 4, 1989 |
| 4,056,028 | G. Keith Patterson | November 1, 1977 |
| 4,291,602 | John Fast, Harvey Williams | September 29, 1981 |
| 4,811,643 | George A. Krieger | March 14, 1989 |
| 5,226,345 | Timothy Gamble | July 13, 1993 |

The third system found in the prior art is commonly used for guides that include a broad base upon which the saw slides during the cut. This base can be made of a cutable material, such as fiberboard. When a given saw is first used on this type of guide, the resulting cut edge has the proper offset from the raised guide edge along which the saw base plate moves. The guide is then aligned for subsequent cuts by placing this cut edge against the intended line of cut. This approach can be used for diagonal or perpendicular cuts at 90 degrees to the plane of the workpiece surface. For bevel cuts (those not perpendicular to the surface), the offset changes and the calibration is no longer valid. The calibration is only valid for a given saw and blade in any case, so that a new guide (or at least a new guide extension) is required to accommodate a change of blade. U.S. Pat. No. 5,365,822 by Stapleton (1994) describes a guide where the base on which the aligning edge is cut is an integral extension to the guide bar. Each saw and blade combination, therefore, requires a separate device. A more practical approach is reflected in U.S. Pat. No. 4,867,425 by Miraglia (1989), which mounts a guiding edge onto a disposable panel of fiberboard or similar material that is then cut to provide the aligning edge. This adds the complication of assembly. A further disadvantage is that repeated use will feather the edge of the guide making precise alignment more difficult and eventually requiring replacement Patents describing devices that use this type of alignment system are listed in Table 10.

TABLE 10

Patents Describing Devices that Use a full Length Saw Cut as an Alignment Aid

| Patent | Inventor | Date Granted |
|---|---|---|
| 3,536,112 | Steve Kordyban | October 27, 1970 |
| 3,830,130 | Harold E. Moore | August 20, 1974 |
| 4,075,920 | Edwin S. Neal | February 28, 1978 |
| 4,059,038 | Simon P. Reitema | November 22, 1977 |
| 4,244,118 | Chester Matuszak | January 13, 1981 |
| 4,307,513 | Charles A. Genge | December 29, 1981 |
| 4,356,748 | Charles W. Tilton | November 2, 1982 |

TABLE 10-continued

Patents Describing Devices that Use a full Length Saw Cut as an Alignment Aid

| Patent | Inventor | Date Granted |
|---|---|---|
| 4,453,438 | Joseph M. Zelli | June 12, 1984 |
| 4,539,881 | Peter Maier | September 10, 1985 |
| 4,867,425 | Humbert G. Miraglia, Jr. | September 19, 1989 |
| 5,206,999 | Tom Stone | May 4, 1993 |
| 5,365,822 | Michael F. Stapleton | November 22, 1994 |

The fourth alignment system also uses an initial saw cut for calibration. However, the cut is made in the end block or clamping system that abuts the edge of the workpiece. The end block simply extends beyond the edge of the guide bar sufficiently so that when the saw is passed along the guide bar it makes a cut in the end block. This cut is then aligned on the edge of a workpiece at the intended line of cut. This approach has the disadvantage that the initial cut is only appropriate for one angle of cut and one bevel angle. Cuts at several angles will quickly destroy the end block, requiring replacement of this integral part of the panel cutting guide. Patents employing saw cuts on an end block to calibrate the alignment system include U.S. Pat. Nos. 4,054,077 to Gram (1977), 4,065,114 to Pennington (1977), and 4,306,479 to Eberhardt (1981).

The fifth type of alignment system is the offset gauge. This gauge is simply a spacer of width precisely equal to the necessary offset. A series of gauges or a gauge with several dimensions can be used for various saw and blade combinations. A variation on the offset gauge approach uses an alignment bar attached via hinge to the guide bar. An example of this variation is U.S. Pat. No. 5,472,029 to Ketch, Dec. 5, 1995. This device includes a gauge bar parallel to the guide bar that can be set at the correct distance for each tool and cutter. It is connected to the guide bar by a hinge and can be swung out of the way after using it to position the guide bar. A similar approach is applied in U.S. Pat. No. 3,287,808 granted to Fortune Nov. 29, 1966. This approach should be easier to use for aligning both ends of the guide bar because the gauge bar is quite long. However, it has other shortcomings. Aside from the obvious expense of such a device, it is apparent that setting and resetting it with a change of tools or cutters is an awkward task. It is possible to calibrate the offset gauge with a saw cut for some proposed designs. The offset gauge can be used for angle cuts, will not wear appreciably in use, and can be inexpensively replaced for some designs. However, it is awkward to use in that it is one more item to handle while aligning and clamping opposite ends of a guide bar along a cut. Patents describing devices using offset gauges are listed in Table 11.

TABLE 11

Patents Describing Devices that Use an Offset Gauge for Alignment

| Patent | Inventor | Date Granted |
|---|---|---|
| 2,942,633 | Berton E. King | June 28, 1960 |
| 2,773,523 | Lloyd M. Hopla | December 11, 1956 |
| 3,910,146 | William L. Earl | October 7, 1975 |
| 4,028,976 | Peter Kundikoff | June 14, 1977 |
| 5,271,159 | Andy H. T. Chen | December 21, 1993 |
| 4,356,748 | Charles W. Tilton | November 2, 1982 |
| 4,494,434 | Robert W. Young | January 22, 1985 |

TABLE 11-continued

Patents Describing Devices that Use an Offset Gauge for Alignment

| Patent | Inventor | Date Granted |
|---|---|---|
| 5,148,730 | Ronald A. McCaw | September 22, 1992 |
| 5,472,029 | Andrew D. Ketch | December 5, 1995 |

The sixth alignment system in prior art is applicable to frame-type devices only. For such devices the frame supporting the saw is fixed above a work surface and the workpiece is simply slid into position beneath the saw. The saw blade can generally be visually aligned with the intended line of cut. This system is not relevant to the portable guide system anticipated in this patent application.

OBJECTS AND ADVANTAGES

The cutting guide of the current invention addresses the shortcomings of prior art as described below, providing an economical guide system with previously unknown safety and convenience. It provides significant advantages for each of the basic requirements of a cutting guide:

(a) the invention provides lateral support to prevent movement away from the line of cut without the use of saw base modifications or complicated base plate attachments;

(b) the invention provides integral means of securing the guide to the workpiece with clamps that secure the workpiece on both sides of the cut so that the workpiece will not collapse during or after the cut;

(c) the invention provides an easily used alignment system that is universal in that it can be used for any angle of cut and any saw and blade combination;

(d) the alignment system assures that alignment at one edge of the workpiece does not disturb the alignment at the other edge.

(e) the invention provides for an economical device because the complications evident in some prior art are avoided;

(f) the invention provides for increased safety and productivity because of the ease of use and inherent advantages of the clamping and alignment systems.

Further objects and advantages of my invention will become apparent from a consideration of the drawings and ensuing description.

DESCRIPTION OF DRAWINGS

The invention in a preferred embodiment is represented in FIGS. 1, through 8b.

List of Reference Numerals

| | | |
|---|---|---|
| 10 guide bar | 24 eccentric lever | 40 template |
| 11 guide bar slots | 25 pin | 50 threaded T-bolt |
| 20L left hand clamp bar assembly | 26 clamp screw | 51 tensioning wedge |
| 20R right hand clamp bar assembly | 27 clamp nut | 52 tapered washer |
| 21 clamp bar frame | 28 clamp plate | 53 threaded nut |
| 22 T-bolt | 29 handle | |
| 23 T-bolt channel | 30 lateral guide | |

SUMMARY

A cutting guide as disclosed by the present invention comprises a guide bar that restricts the lateral movement of a cutting tool, two clamp bars that secure the guide bar to the workpiece, a means of positioning the clamp bars relative to the intended line of cut, a means of attaching the guide bar to the clamp bars, and a fence accessory fixture for the cutting tool to aid in following the guide bar.

DESCRIPTION OF THE PREFERRED EMBODIMENT

Figure 1:
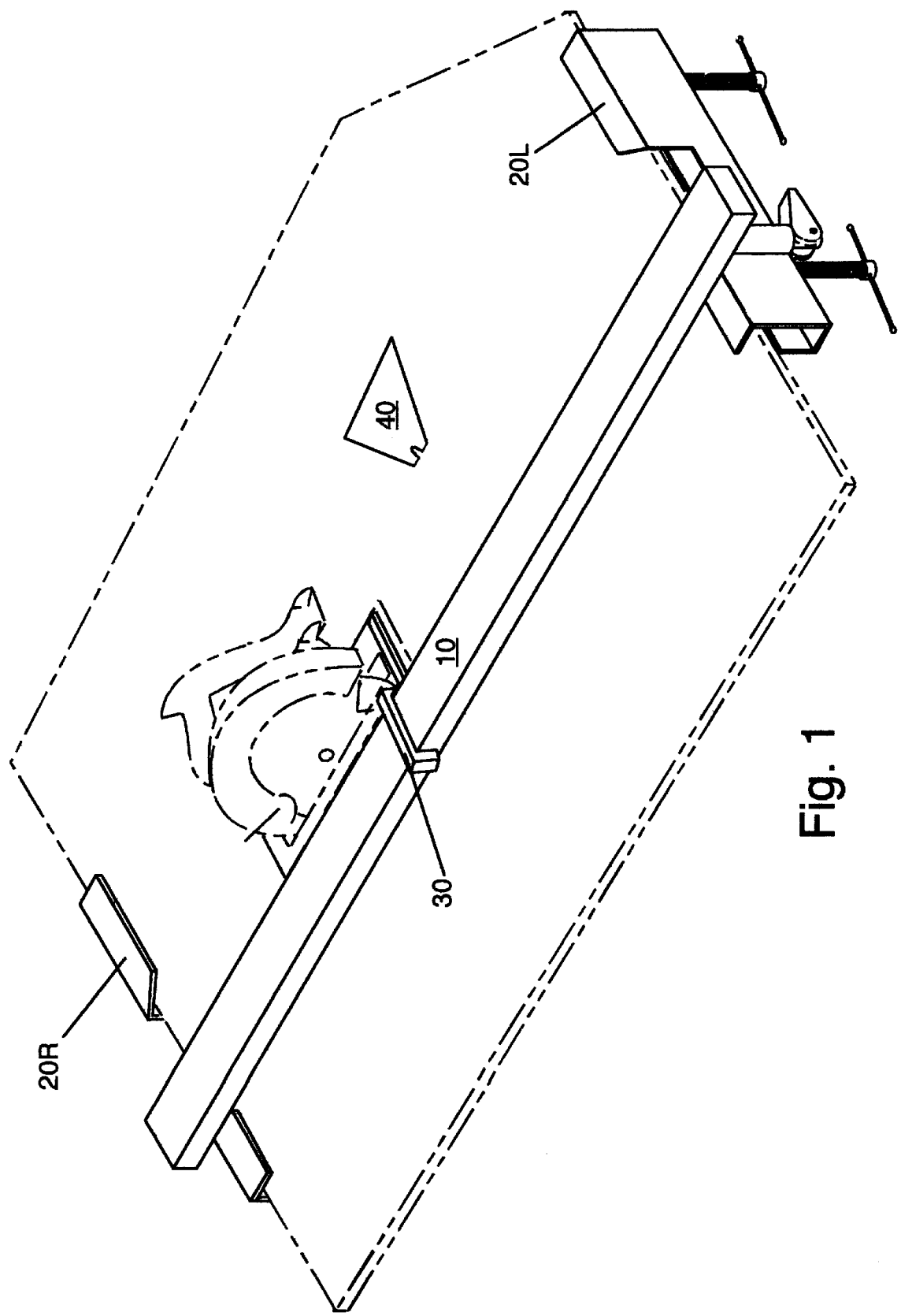
FIG. 1 is an isometric overview of the invention as it might look in practice attached to a panel to be cut.
Figure 2A:
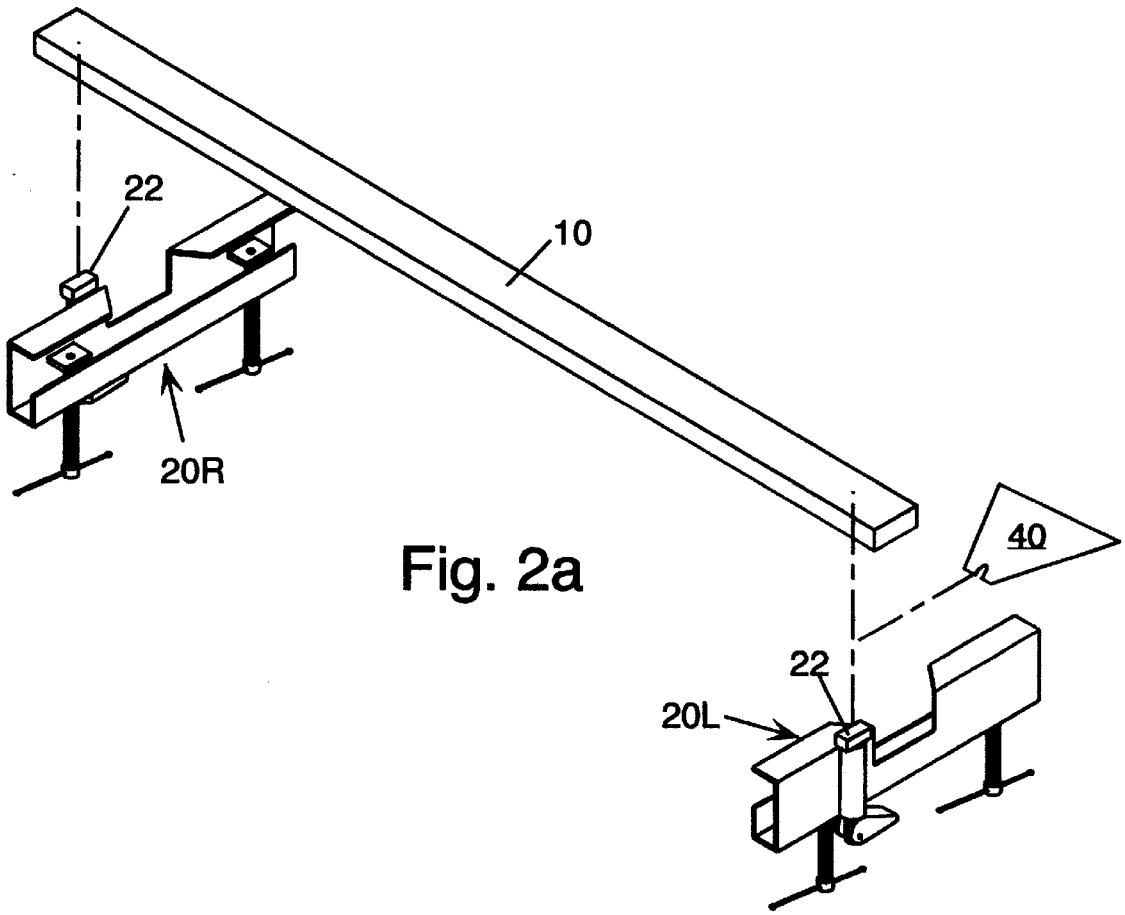
FIG. 2a is a partially exploded isometric overview without the panel in place showing the guide bar separated from the clamp bars for clarity.

A convenient embodiment of the cutting guide of the present invention is illustrated in FIG. 1 as it may appear in use. The cutting guide is comprised of a guide bar 10 of rigid material and of uniform cross section such that it presents a straight edge along which the cutting tool, shown here as a circular saw, can advance. The guide bar is secured to the work piece in the proper position relative to the intended line of cut by attachment to two clamp bars 20R and 20L, one at either end of the cut. The clamp bars are secured to the work piece by integral clamps. The clamp bars are notched or otherwise designed to avoid interference with the cutter. The cutting guide may be used with a fence 30, that attaches to the saw or tool base plate and hooks over the guide bar, restricting lateral movement of the tool away from or beneath the guide bar. A template 40 that is used for alignment is shown lying on the workpiece in FIG. 1. An exploded overview is shown in FIG. 2 without the workpiece in place to more clearly show the main components.

Figure 2B:
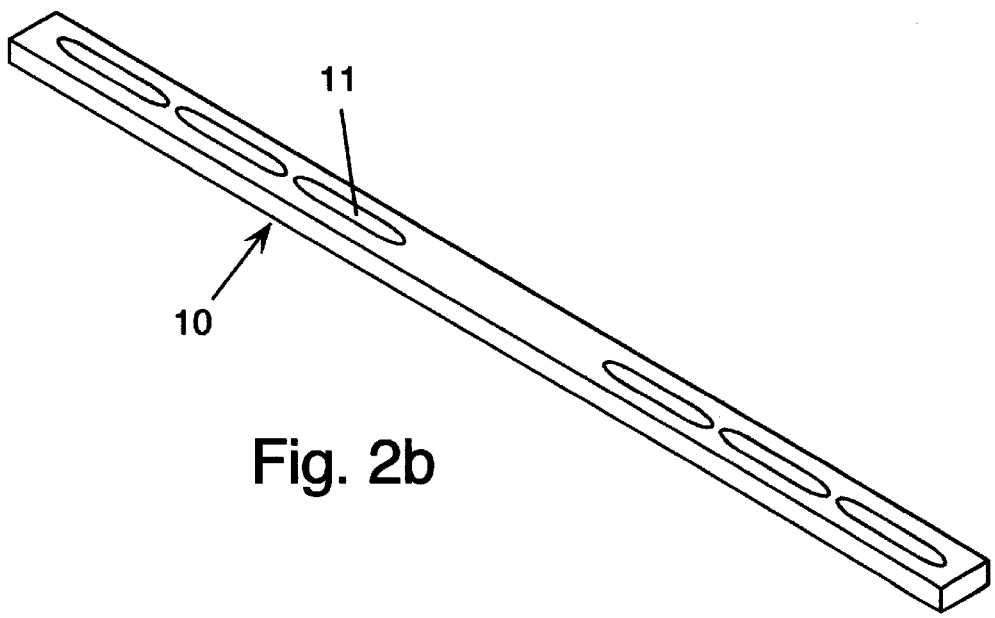
FIG. 2b shows the underneath side of the guide bar.
Figure 3:
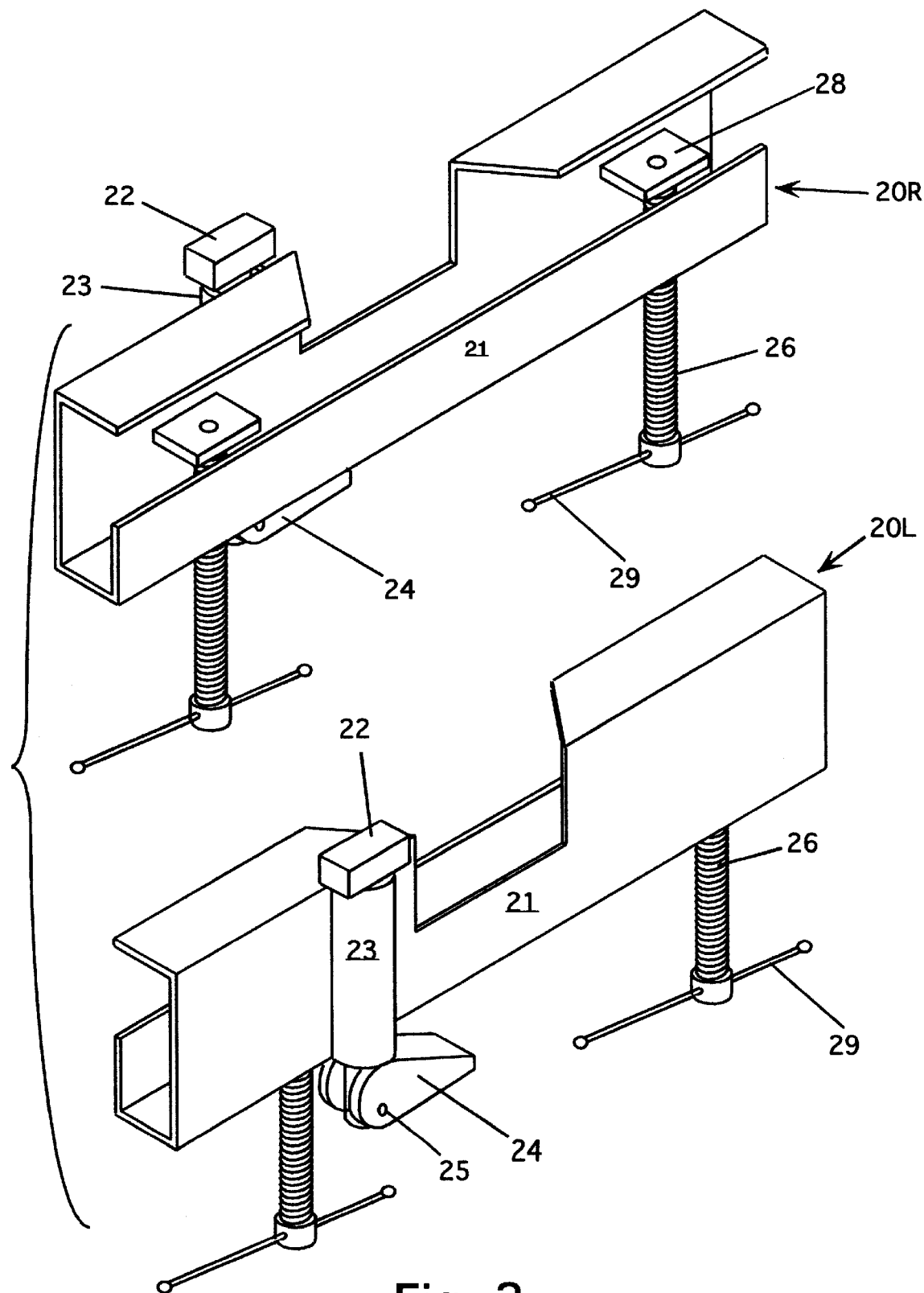
FIG. 3 shows the left and right hand clamp bars fully assembled.

The guide bar 10 comprises a rigid tube of rectangular cross section with slots 11 in the bottom surface centered along the longitudinal axis as shown in FIG. 2b. To maintain the strength of the guide bar, a series of slots may be used rather than one continuous slot. The width of the slots is equal to the width of the T-bolt 22 so that the T-bolt can be inserted into the slot 11 when it is turned with the long axis to the T-bolt head aligned with the axis of the slot. When turned at 90 degrees to this orientation, the edges of the T-bolt head will engage the edges of the slot. This is shown in detail in FIGS. 5a, 5b, and 5c.

Figure 4:
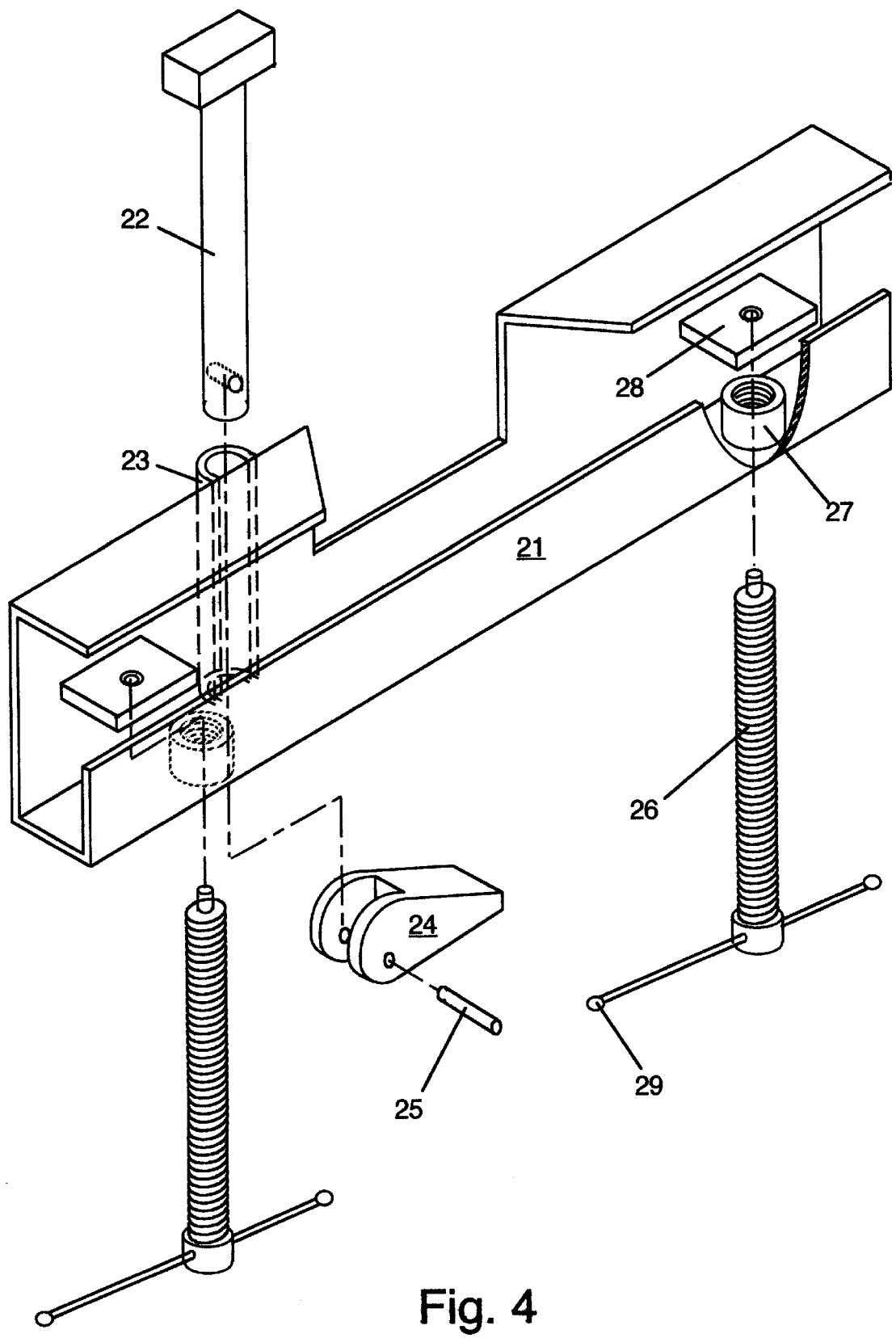
FIG. 4 is an exploded isometric view of the right hand clamp bar.

The clamp bars, 20R shown also in exploded view in FIG. 4 and 20L, serve the dual purpose of attaching the cutting guide to the work piece and of holding the workpiece together during and after the cutting operation. There is one left hand 20L and one right hand 20R clamp bar required.

Each clamp bar consists of a rigid frame 21 that holds two clamps for attaching the clamp bar to the work piece and a T-bolt system for securing the clamp bars to the guide bar 10. The left and right hand clamp bars differ by including the T-bolt system on opposite sides of the centerline of the frame 21. The clamps in the preferred embodiment each consist of a clamp screw 26 with handle 29, a nut 27 affixed to the frame 21, and a clamp plate 28 riveted to the top of the clamp screw 26.

Figure 5A:
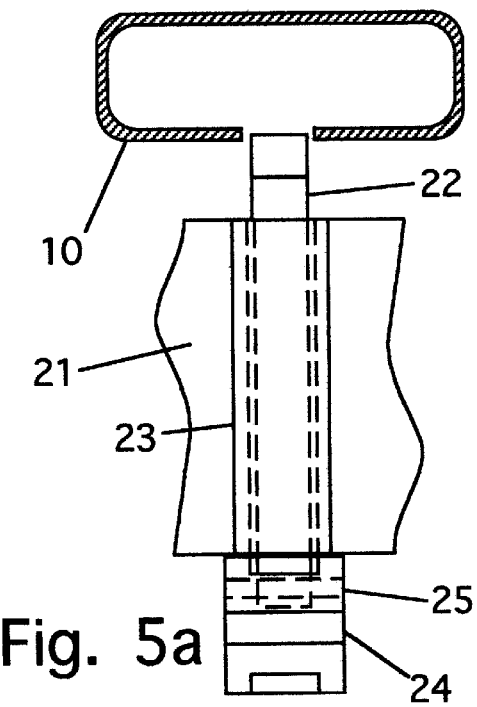
FIGS. 5a, 5b, and 5c are a partial elevation view of a clamp bar showing the means of tensioning the T-bolt that attaches the guide bar to the clamp bars.
Figure 5B:
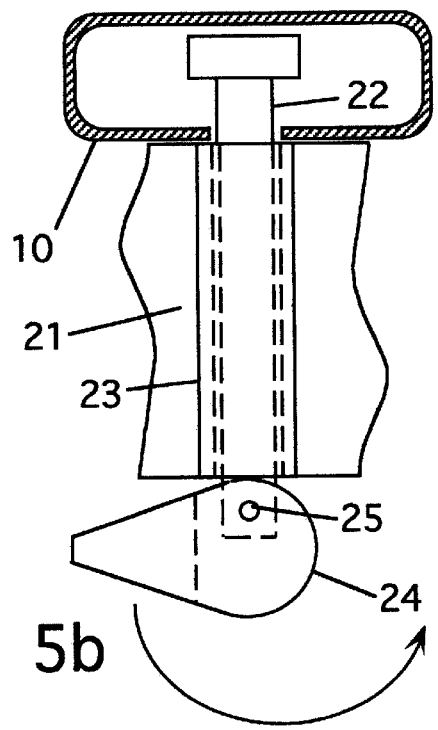
Figure 5C:
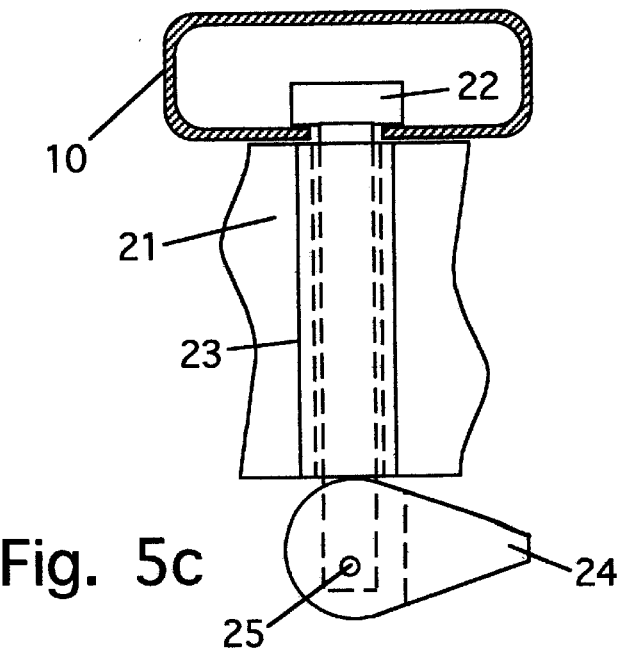
Figures 6A, 6B, 6C:
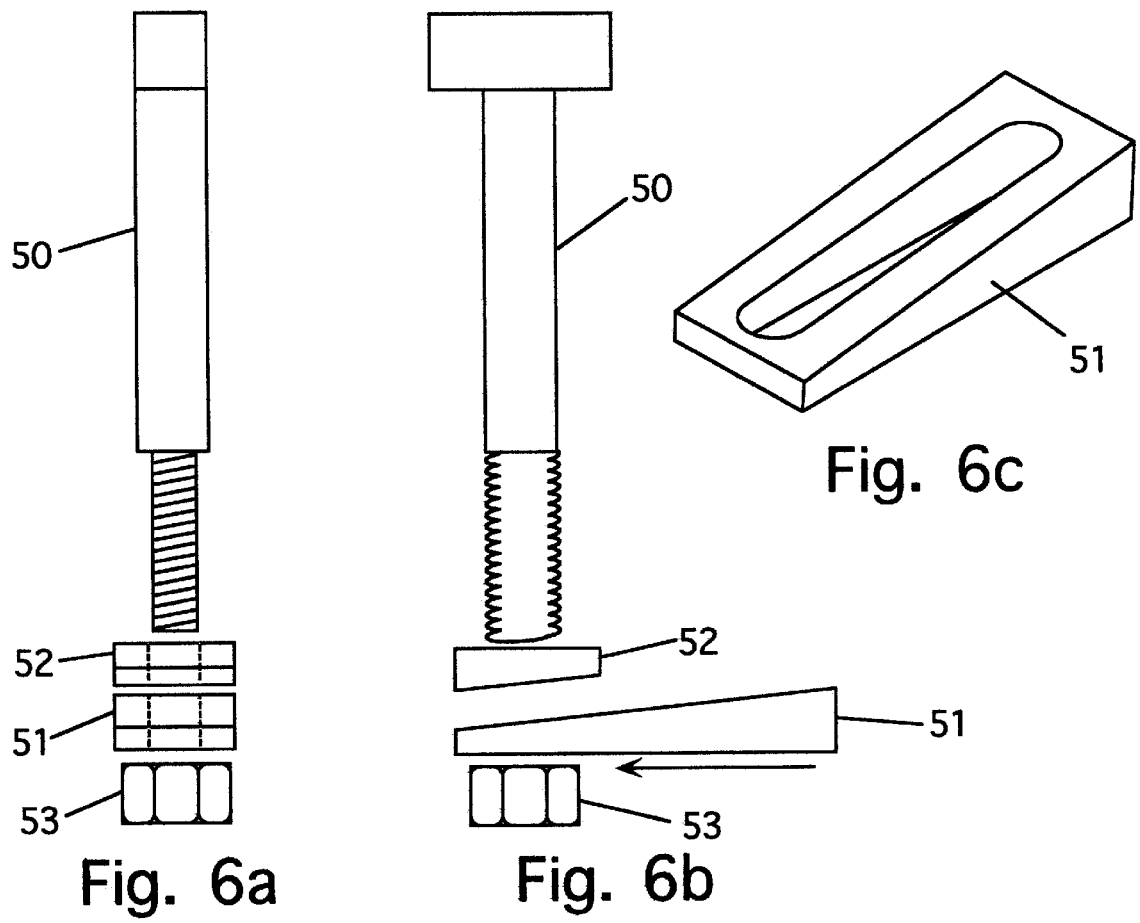
FIGS. 6a, 6b, and 6c show an alternative means of tensioning the T-bolt
Figure 7:
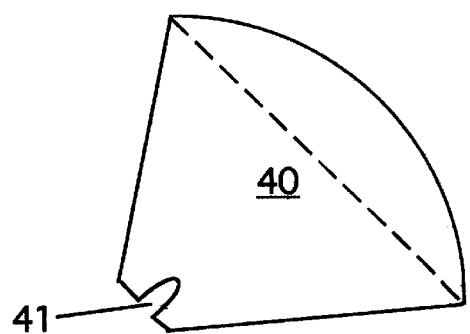
FIG. 7 shows the template used to align the guide.

The T-bolt system for attaching the guide bar 10 consists of the T-bolt 22, which fits into the T-bolt channel 23 and a means of tensioning the T-bolt when it is inserted into slots in the guide bar 10. A tensioning system is shown in FIGS. 5a, 5b, and 5c. An eccentric lever or cam is affixed to the T-bolt by means of a pin 25, which is located off-center at the round end of the lever 24. Flipping the eccentric lever from one side to the other will raise and lower the T-bolt 22. This motion is used to secure the clamp bars 20R and 20L to the guide bar 10. FIGS. 6a through 6c show an alternative tensioning system using a wedge 51 positioned on a threaded T-bolt 50 with a matching tapered washer 52 and threaded nut 53. The threaded T-bolt 50 is flattened on two opposite sides so that the wedge 51 and tapered washer will maintain the correct relative positions. The flats also permit rotation of the T-bolt by rotation of the wedge, which is required for operation as described below. FIG. 7 shows a template 40, which is used to position the clamp bars. The template is made of thin durable material that is easy to cut, such as plastic. The template 40 has a hole in one corner that is open on one side forming a notch 41. The hole is of the same diameter as the T-bolt allowing the notch 41 to be used to position the template against the T-bolt 22 or threaded T-bolt 50.

Figure 8A:
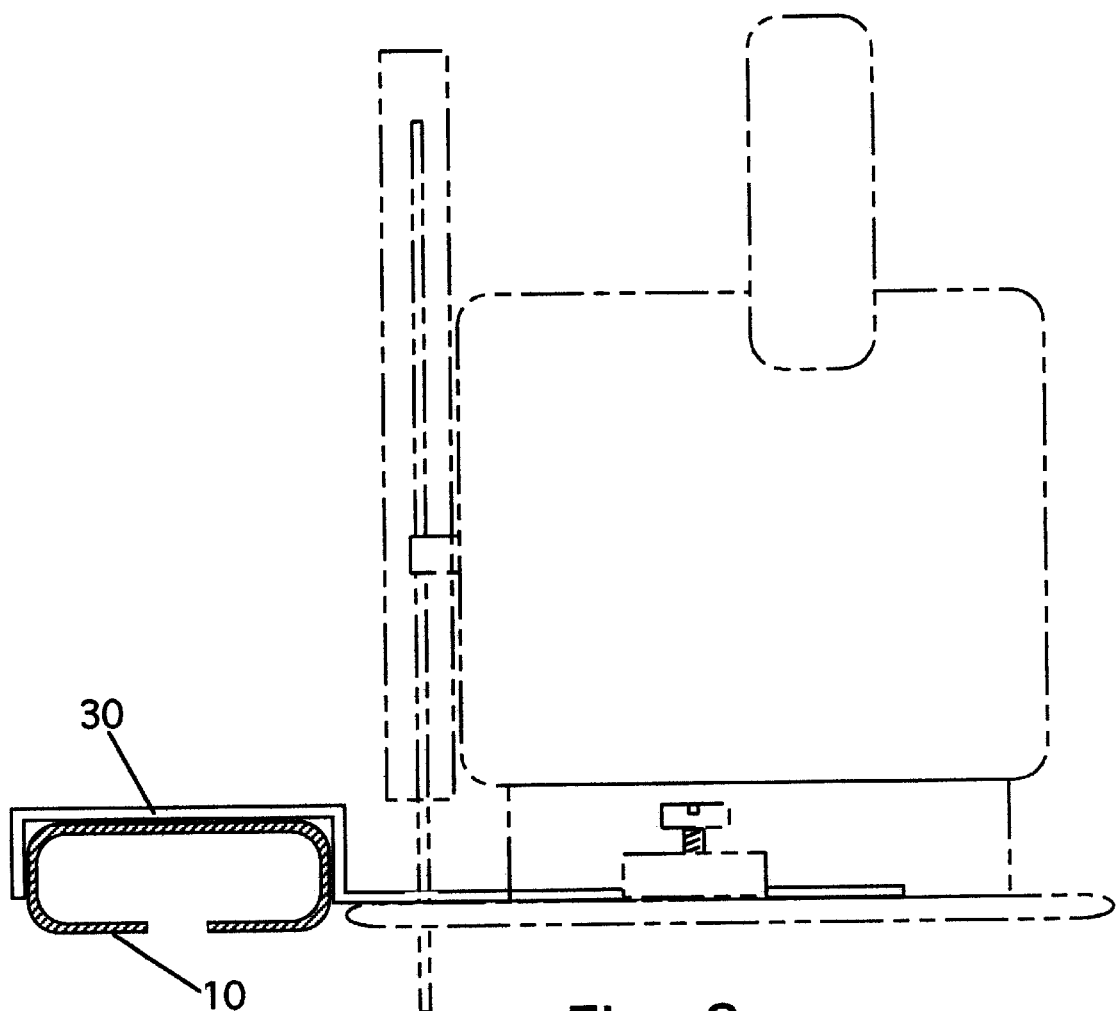
FIG. 8a shows the a lateral guide suitable for use with a circular saw attached to such a saw.
Figure 8B:
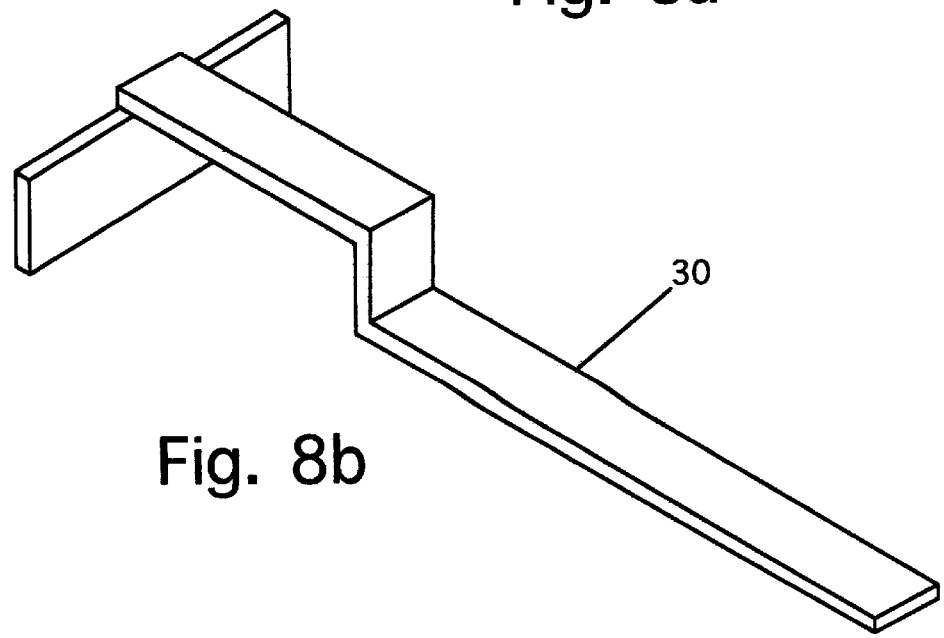
FIG. 8b shows a variation on the lateral guide.

The lateral guide 30 shown in FIG. 1 and FIG. 8a conforms to the cross section of the guide bar and extends away from the guide bar for attachment to the tool base. This extended portion is of uniform cross section appropriate for insertion into the rip fence receiver of the tool. The shaped portion of the lateral guide may be extended in width to increase the line of contact with the guide bar as shown in FIG. 8b.

OPERATION

The advantages of the present invention are best clarified by a description of its operation. A calibration step is required prior to operation using a given saw so that the template 40 can be used to position the clamp bars. Once calibrated, the template can be used repeatedly for cuts made with the same saw.

To calibrate the template, a scrap workpiece is placed on convenient supports, such as saw horses, and the right hand clamp bar 20R is fixed to the workpiece along the edge nearest the operator. The second clamp bar 20L is fixed along the opposite edge of the workpiece. The uncalibrated template, shown in FIG. 7, is then placed on the T-bolt of the clamp bar 20R by sliding the notch 41 snugly against the T-bolt. The body of the template extends over the line of cut. The template is secured in this position by placing the guide bar 10 in position on the T-bolts of both clamp bars and tensioning the T-bolts as described below. Finally, a light cut taken with the saw will trim the edge of the template, resulting in perfect calibration for the saw and blade combination. For other saw and blade combinations a separate template can be trimmed. Also, one template can have two or more trimmed edges. A trimmed edge is represented by the dashed line on the template 40 in FIG. 7. It is important for proper use of the template to note that it has a face and a back side. The side facing upward during the calibrating cut is the face. The template can be marked or color-coded to clearly indicate the face side.

Once calibration is completed, accurate positioning and operation of the saw guide is very simple. First, the workpiece is set on suitable supports, such as saw horses or blocks, positioning the workpiece approximately horizontal. The intended line of cut is marked either completely across the workpiece or at least near the edges. The right hand clamp bar 20R is placed snugly against the edge where the cut will start approximately centered on the marked cut line. The calibrated template is positioned against the T-bolt of the clamp bar 20R and the clamp bar is moved left or right along the workpiece edge until the trimmed edge of the template aligns with the marked line of cut. The template must be used with the face side up to position the right hand clamp bar 20R. Because of the method of trimming the template, the waste side of the cut is to the left of the line along the edge of the template. This allows for very accurate positioning of the guide. Once positioned relative to the line of cut, the clamp bar is secured to the workpiece by tightening the clamp screws.

The left hand clamp bar 20L is then positioned in a similar manner. First, it is placed along the far edge of the workpiece, i.e., the edge where the cut will be completed. The clamp bar 20L is approximately centered on the marked line of cut. The template is again used for final positioning of the clamp bar. However, for this left hand clamp bar the template must be used with the face side down. Once positioned, the clamp screws are tightened. With the clamp bars thus positioned, it is clear that the line of cut passes through the cut-out in the center of the clamp bars. This allows clearance for the blade to cut through the workpiece without hitting the clamp bar. Note that setting the clamp bar on the far edge of the workpiece is completely independent of setting the clamp bar on the front edge. No iteration is required to attain perfect positioning.

With the clamp bars 20R and 20L secured, the T-bolts 22 are turned so that the long axis of their rectangular top is parallel to the line of cut. This positioning should also place the tensioning lever 24 in a convenient position for its operation. Generally, this will be the loose position with the lever facing away from the workpiece edge. FIGS. 5a and 5b show the loose position for the eccentric tensioner 24. In addition, the tensioner 24 is turned so that the top of the T-bolt is aligned with a slot 11 in the guide bar 10. With the T-bolts for both the left and right hand clamp bars aligned in this way, the guide bar is positioned over the T-bolts. The tensioner 24 is then rotated about the axis of the T-bolt so that the top of the T-bolt is aligned perpendicular to the slots 11 in the guide bar as shown in FIG. 5b. The tensioner 24 is then swung to the tensioned position as shown in FIG. 5c, securing the guide bar to the clamp bars.

An alternative means of tensioning the T-bolt is shown in FIGS. 6a through 6c. With this system, the wedge 51 is pulled out so that the T-bolt is not tensioned. Two opposite sides of the threaded T-bolt 50 are machined flat to fit snugly in the slot of the wedge. Therefore, the T-bolt can be rotated by turning the wedge. In addition, the washer 52 is slotted to match the cross section of the T-bolt. In this way, the tapered washer will maintain the proper alignment relative to the wedge. Tensioning is accomplished by moving the wedge in the direction of the arrow in FIG. 6b.

With the guide bar in place, the cut can be completed. The cut is made from the near edge where the right hand clamp bar is located to the far edge where the left hand clamp bar is located. The cut is made while holding the right edge of the saw base against the left edge of the guide bar. Note that the workpiece remains supported throughout the cut by the clamp bars, which clamp on both sides of the cut Therefore, it is not necessary to provide independent support for the workpiece along the line of cut or to have an assistant support the work at the end of the cut.

The operation is further simplified by use of a lateral guide 30 to prevent the saw from drifting away from the edge of the guide bar. If thin or flexible material is being cut, there is danger of the saw base sliding under the guide bar as well. The simple lateral guide 30 will prevent both types of lateral movement and can assist in supporting the weight of the saw on flexible workpieces by transferring some of the weight to the guide bar 10. The lateral guide, as shown in FIGS. 1 and 8a and 8b, is attached to the saw in the same manner as the commonly used circular saw rip fence for making cuts parallel to an existing workpiece edge. All circular saws are equipped with a receptacle in the base for such a fence. Thus, no saw modification is required for use of our lateral guide 30. Other cutting devices, such as jig saws and routers can generally accommodate similar lateral guides.

After completion of the cut, the T-bolt tension is released and the guide bar is removed. The clamp bars can then be removed, allowing the separation of the cut panel.

CONCLUSIONS, RAMIFICATIONS, AND SCOPE OF INVENTION

Thus it is clear that the cutting guide of the invention offers significant advantages in safety, accuracy, simplicity, and economy. In particular, it solves the problems of accurate universal alignment, secure support of and to the workpiece, and simple lateral guidance that are the essential features of a successful guide.

While the description provided above is specific as to structure and operation, these specifics are not meant as limitations on the scope of the invention, but as characteristic of one preferred embodiment. Many variations are possible for each element of the invention. For instance, the clamp assembly may use spring clamps, C-clamps, knuckle clamps or other clamp types. These may be attached by any rigid member constructed so as to avoid interference with the cutting tool, provide the needed strength to hold the workpiece together, and provide a point of attachment for the guide bar.

The guide bar may be constructed of aluminum extrusion with a continuous slot or other provision for attaching to the clamp assemblies. Other materials and designs for the guide bar are also acceptable. It may be convenient to provide a slot in the top of the guide bar to receive an edge of the lateral guide rather than have the lateral guide fit over the entire guide bar cross section. Other means of securing the guide bar to the clamp assemblies can also be used, including bolts, clamps, and various latches, provided that the guide bar can be attached at various angles and in a consistent position relative to the clamp assemblies.

The template can be color coded to indicate the face and reverse sides. Corresponding codes may be applied to the left and right hand clamp assemblies. The template can be printed with labels or spaces for identification of the corresponding tools. It can be attached to the clamp assemblies rather than being removable. It may take almost any plane geometric shape that extends across the line of cut for calibration.

Therefore, the scope of the invention should be determined by the appended claims and their legal equivalents rather than by the specific embodiments illustrated in the description and drawings above.

I claim:

1. A portable guide for cutting, routing, or other machining operations with portable power tools comprising:
   a first clamp assembly;
   a second clamp assembly;
   said first claim assembly comprising:
   two or more clamps that may be removably attached to the edge of a workpiece, wherein at least one said clamp can be affixed on each side of the intended line of cut;
   means of rigidly connection said clamps together in fixed position and orientation relative to one another;
   such means having sufficient strength to prevent relative movement of the two sections of the workpiece created by a cutting or routing operation when said first clamp assembly is used in cooperation with said second clamp assembly on the opposite edge of the workpiece;
   means associated with said first clamp assembly for avoiding interference between the cutting tool and said first clamp assembly;
   means of aligning said first clamp assembly properly relative to the intended line of cut and along one edge of the workpiece;
   said second clamp assembly comprising:
   two or more clamps that may be removably attached to the edge of a workpiece, wherein at least one said clamp can be affixed on each side of the intended line of cut;
   means of rigidly connecting said clamps together in fixed position and orientation relative to one another;
   such means having sufficient strength to prevent relative movement of the two sections of the workpiece created by a cutting or routing operation when said second clamp assembly is used in cooperation with said first clamp assembly on the opposite edge of the workpiece;
   means associated with said second clamp assembly for avoiding interference between the cutting tool and said clamp assembly;
   means of aligning said second clamp assembly properly relative to the intended line of cut and along one edge of the workpiece opposite said first clamp assembly;
   a rigid guide bar;
   said guide bar being of uniform cross section and sufficient strength to restrict lateral movement of the cutting tool as the tool base is slid along the edge of said guide bar;
   said guide bar being of sufficient length to extend beyond the intended line of cut at both ends of that line;
   said guide bar having a plurality of slots in its base that engage a fastening system on said first and second clamp assemblies;
   means of detachably securing said rigid guide bar to said first and second clamp assemblies in close proximity to the surface of the workpiece and aligned with the intended line of cut.

2. The portable guide of claim 1, wherein said fastening system on said first clamp assembly and on said second clamp assembly comprises:
   a channel fixed to said clamp assembly perpendicular to the plane of the workpiece;

a rod slidably fit into said channel;
  said rod being free to rotate but prevented from lateral movement by said channel;
a lateral protrusion on one end of said rod;
  said lateral protrusion can be inserted into said slot in the guide bar when aligned with said slot;
  said lateral protrusion will engage one or both longitudinal edges of said slot when aligned perpendicular to said slot and tensioned along the axis of said rod;
a releasable tensioning device on the other end of said rod;
  said tensioning device preventing rotation of said rod when engaged and securing said guide bar rigidly against said clamp assembly;
a means for engaging and releasing tension on said rod.

3. A portable guide for cutting, routing, or other machining operations with portable power tools comprising:

a first clamp assembly;

a second clamp assembly;

said first clamp assembly comprising:
  two or more clamps that may be removably attached to the edge of a workpiece, wherein at least one said clamp can be affixed on each side of the intended line of cut;

means of rigidly connecting said clamps together in fixed position and orientation relative to one another;

such means having sufficient strength to prevent relative movement of the two sections of the workpiece created by a cutting or routing operation when said first clamp assembly is used in cooperation with said second clamp assembly on the opposite edge of the workpiece;

means associated with said first clamp assembly for avoiding interference between the cutting tool and said fir clamp assembly;

means of aligning said first clamp assembly properly relative to the intended line of cut and along one edge of the workpiece;

said second clamp assembly comprising:
  two or more clamps that may be removably attached to the edge of workpiece, wherein at least one said clamp can be affixed on each side of the intended line of cut;

means of rigidly connecting said clamps together in fixed position and orientation relative to one another;

such means having sufficient strength to prevent relative movement of the two sections of the workpiece created by a cutting or routing operation when said second clamp assembly is used in cooperation with said first clamp assembly on the opposite edge of the workpiece;

means associated with said second clamp assembly for avoiding interference between the cutting tool and said clamp assembly;

means of aligning said second clamp assembly properly relative to the intended line of cut and along one edge of the workpiece opposite said first clamp assembly;

a rigid guide bar;

said guide bar being of uniform cross section and sufficient strength to restrict lateral movement of the cutting tool as the tool base is slid along the edge of said guide bar;

said guide bar being of sufficient length to extend beyond the intended line of cut at both ends of that line;

means of detachably securing said rigid guide bar to said first and second clamp assemblies in close proximity to the surface of the workpiece and aligned with the intended line of cut; and an alignment system comprising:

a template comprising;

a thin sheet of durable material that can be cut by the tool in use;

means of attaching said template to teach clamp assembly such that alignment of the attached said template's edge with the intended line of cut will position said clamp assembly;

means of calibrating said template.

* * * * *